(12) United States Patent
Ehlert et al.

(10) Patent No.: US 11,060,487 B2
(45) Date of Patent: Jul. 13, 2021

(54) SYSTEM FOR EVAPORATIVE EMISSIONS MITIGATION

(71) Applicant: MAHLE International GmbH, Stuttgart (DE)

(72) Inventors: Thomas Ehlert, Böblingen (DE); Achim Gommel, Weil der Stadt (DE); John Jackson, Oxford, MI (US); Simon Streng, Stuttgart (DE); Melanie Volz, Königsbach (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 16/706,950

(22) Filed: Dec. 9, 2019

(65) Prior Publication Data

US 2021/0172412 A1 Jun. 10, 2021

(51) Int. Cl.
| | |
|---|---|
| *F02M 25/08* | (2006.01) |
| *F02M 37/36* | (2019.01) |
| *F02D 41/00* | (2006.01) |
| *B01D 46/54* | (2006.01) |
| *F01N 3/08* | (2006.01) |
| *B01D 46/00* | (2006.01) |
| *F02M 37/50* | (2019.01) |

(52) U.S. Cl.
CPC ....... *F02M 25/089* (2013.01); *B01D 46/0036* (2013.01); *B01D 46/543* (2013.01); *F01N 3/0835* (2013.01); *F02D 41/0042* (2013.01); *F02M 37/36* (2019.01); *F02M 37/50* (2019.01)

(58) Field of Classification Search
CPC ..... F02M 25/08; F02M 25/0836–0872; F02M 25/089; B01D 46/543; B01D 46/0036

USPC ........ 123/518–520; 220/640, 653; 73/114.39
See application file for complete search history.

(56) References Cited

U.S. PATENT DOCUMENTS

| | | | |
|---|---|---|---|
| 5,459,360 A | 10/1995 | Varo et al. | |
| 5,957,113 A * | 9/1999 | Masaki | F02M 25/089 123/518 |
| 6,772,740 B2 | 8/2004 | Kojima et al. | |
| 7,261,092 B1 * | 8/2007 | Oku | F02M 25/089 123/516 |
| 8,931,460 B2 * | 1/2015 | Makino | B01D 53/229 123/521 |
| 9,732,649 B2 | 8/2017 | Hiltzik et al. | |
| 2001/0052292 A1 * | 12/2001 | Ito | B01D 53/229 96/134 |

(Continued)

FOREIGN PATENT DOCUMENTS

| | | |
|---|---|---|
| DE | 102006033062 A1 | 1/2008 |
| JP | 2010106766 A | 5/2010 |

*Primary Examiner* — Logan M Kraft
*Assistant Examiner* — Robert A Werner
(74) *Attorney, Agent, or Firm* — Dickinson Wright PLLC (57) ABSTRACT

An improved evaporative emission mitigation system for a motor vehicle includes a canister filled with an adsorbent material connected to a membrane module. The membrane module contains a membrane that separates gaseous hydrocarbons from inert air components within fuel vapor generated by the evaporation of fuel due to the heating of the motor vehicle. The gaseous hydrocarbons separated by the membrane are returned to the canister, where they will again be adsorbed by the adsorbent material. The inert air components are vented from the membrane module into the open atmosphere outside of the motor vehicle.

16 Claims, 3 Drawing Sheets

(56) References Cited

U.S. PATENT DOCUMENTS

| | | | | |
|---|---|---|---|---|
| 2008/0308074 | A1* | 12/2008 | Allen | F02M 25/089 123/519 |
| 2010/0252005 | A1* | 10/2010 | Kitamoto | F02M 25/0836 123/518 |
| 2011/0214646 | A1* | 9/2011 | Makino | B01D 50/00 123/518 |
| 2012/0085325 | A1* | 4/2012 | Makino | B01D 53/04 123/521 |

* cited by examiner

FIG. 5A ical vehicle modes may be dominant. The prevalence of electrical vehicle modes, therefore, results in longer periods between engine operations and to less frequent purging of the system that adsorbs fuel vapors while the engine is idle or not running at all.

SYSTEM FOR EVAPORATIVE EMISSIONS MITIGATION

FIELD OF INVENTION

The present disclosure relates to an evaporative emission mitigation system for use in motor vehicles.

BACKGROUND

Minimizing motor vehicle emissions is important for maintaining environmental air quality and reducing the volume of greenhouse gases contributed to the atmosphere. Mandatory compliance with strict regulations and an independent desire to minimize environmental impacts has led automakers to develop multiple systems for reducing motor vehicle emissions. A significant focus has been developing solutions to reduce emissions resulting from the combustion of fuel by motor vehicles propelled by internal combustion engines. The combustion of fuel, however, is not the only source of emissions that must be mitigated.

For example, motor vehicles also produce hydrocarbon emissions as a result of the evaporation of fuel stored within the vehicle's fuel tank. The warming of fuel via high ambient air temperatures, particularly during summer months, or through indirect heating by exposure of the vehicle to direct sunlight for extended periods of time, greatly increases the volume of evaporative emissions produced by the motor vehicle. The mitigation of evaporative emissions is particularly difficult within hybrid vehicles. Hybrid vehicles use their combustion engines only intermittently, unlike motor vehicles propelled by conventional internal combustion engines, particularly in city environments where electrical vehicle modes may be dominant. The prevalence of electrical vehicle modes, therefore, results in longer periods between engine operations and to less frequent purging of the system that adsorbs fuel vapors while the engine is idle or not running at all.

Historically, these evaporative emissions have been controlled via mitigation systems that include a canister packed with an adsorbent material, such as activated carbon, connected to the vehicle's fuel tank. The activated carbon canisters are engineered to efficiently sequester hydrocarbon vapors entering the canister at high concentrations from the fuel tank, but are generally less efficient at sequestering hydrocarbon fuel vapors at comparatively low concentrations. To address this shortcoming, many evaporative emission mitigation systems include a second adsorbent capture element downstream of the canister, which is engineered to sequester hydrocarbon vapors efficiently at low concentrations, thereby improving the overall capture efficiency of the system and further reducing the level of evaporative emissions released by the vehicle. Despite the improved capture efficiency afforded by mitigation systems equipped with a second adsorbent capture element, increasingly strict regulations and societal pressure requires the development of even more efficient emission mitigation systems.

Rather than using a second adsorbent capture element, some mitigation systems have used a membrane in an effort to further reduce evaporative emissions from motor vehicles. The membranes used in these systems are selectively permeable to hydrocarbon vapors, providing a method for separating the gaseous hydrocarbons from inert air components, such as oxygen and nitrogen. In some systems known in the art, the membrane is used to concentrate the hydrocarbon vapors before passing them on to a condenser, with the condensate ultimately being returned to the fuel tank. In another system known in the art, the membrane is used to concentrate and condense the hydrocarbon vapors, but only during a regenerative purge cycle for an adsorbent canister included within the system. In this system, the condensed fuel is returned to the fuel tank with the primary purpose of the system being to improve fuel economy by reducing evaporative fuel losses. In yet another system known in the art, a membrane is included upstream of an adsorbent canister as a mechanism for concentrating the fuel vapors prior to their introduction into the canister. While this system nominally improves capture efficiency within the canister, it does not address the emission of vapors that may not have been efficiently sequestered within the canister or those vapors that may spontaneously desorb from the adsorbent material within the canister.

SUMMARY

An evaporative emission mitigation system equipped with a membrane module is disclosed herein. The membrane module is designed to separate gaseous fuel vapors from inert components of air, such as oxygen and nitrogen, in order to minimize the environmental release of fuel vapors resulting from the evaporation of fuel stored within a motor vehicle. The membrane module is paired with a canister of conventional design that contains an adsorbent substance for capturing fuel vapors produced within the fuel tank of a motor vehicle.

The membranes within the disclosed evaporative emission mitigation system separate gaseous hydrocarbon fuel vapors from inert air components, e.g. oxygen and nitrogen, via a solution-diffusion mechanism. Briefly, molecules initially adsorb to the surface of the membrane before diffusing across the membrane through membrane spanning microchannels. Post diffusion to the opposite side of the membrane, the molecules desorb from the surface of the membrane. The ability of a molecule to adsorb, diffuse across the membrane, and desorb, a property known as permeability, is strongly dependent upon the size of the molecule and its chemical polarity. For example, silicone-based membranes may be configured such that larger, non-polar molecules like butane are at least ten-fold more permeable across the membrane than oxygen or nitrogen. Thus, membranes that rely upon solution-diffusion mechanisms afford the ability to separate hydrocarbon vapors from inert air constituents, such as oxygen and nitrogen.

The driving force for the permeation of hydrocarbons across the membrane lies in the partial pressure gradient of the gaseous hydrocarbons across the membrane. More specifically, the partial pressure of a gaseous hydrocarbon will be high near an inlet on one side of the membrane, while the region on the opposite side of the membrane will have a comparatively low gaseous hydrocarbon partial pressure. The fundamental principle of diffusion, that is the migration of a molecule from an area of high concentration to an area of low concentration, drives the permeation of the gaseous hydrocarbons across the membrane. As more gaseous hydrocarbon molecules permeate the membrane, however, the partial pressure on the side of the membrane opposite the inlet increases, reducing the diffusion driving force for the transport of gaseous hydrocarbons across the membrane. Therefore, the region opposite the side of the membrane with the hydrocarbon inlet is preferably continuously evacuated to maintain a low concentration of gaseous hydrocarbons, thereby maintaining membrane separation efficiency.

The evaporative emission mitigation system disclosed herein includes a canister mounted on a motor vehicle, configured to connect to the fuel tank via a tank passage. The canister contains a volume of an adsorbent material, which adsorbs gaseous hydrocarbons present within the fuel vapor that are produced by the heating of the fuel within the car. A membrane module is connected to the canister via both a canister passage and a recycling passage, wherein the membrane module contains a membrane that is configured to separate gaseous hydrocarbons from inert air components, e.g. oxygen and nitrogen, within the fuel vapor. The membrane divides the membrane module into a first compartment and a second compartment.

The evaporative emission mitigation system disclosed herein is configured such that the fuel vapor travels from the fuel tank to the canister via the tank passage, where a portion of the gaseous hydrocarbons are adsorbed within the canister by the adsorbent material, thereby producing a residual volume of fuel vapor. The residual fuel vapor may be vapor that was not efficiently adsorbed within the canister on a first pass, or may be vapor that has spontaneously desorbed from the adsorbent material within the canister. The residual fuel vapor then travels from the canister to the membrane module via the canister passage and is separated into gaseous hydrocarbons, which permeate the membrane from the first compartment into the second compartment, and inert air components. The gaseous hydrocarbons are returned to the canister via the recycling passage, where they will be adsorbed by the adsorbent material, thereby mitigating the release of evaporative emissions from the motor vehicle.

BRIEF DESCRIPTION OF THE DRAWINGS

The invention is described in greater detail below with reference to the various embodiments illustrated in the appended drawings. In the drawings.

The drawings are provided herewith for purely illustrative purposes and are not drawn to scale or intended to limit the scope of the present invention.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. Accordingly, the following description is presented by way of illustration only and should not limit in any way the various alternatives and modifications that may be made to the illustrated embodiments while remaining within the spirit and scope of the invention.

The term "passage", as used herein, is defined to include any acceptable form or structure for linking elements within the evaporative emission mitigation system. Non-limiting examples of passages include: pipes of a variety of compositions, tubing of a variety of compositions, thermoplastic material formed into channels, openings within a housing wall between two structural components, and the like.

The term "upstream", as used herein, specifies the relative position of components within the evaporative emission mitigation system, and is defined as being nearer the fuel tank.

The term "downstream", as used herein, specifies the relative position of components within the evaporative emission mitigation system, and is defined as being further from the fuel tank.

Figure 1:
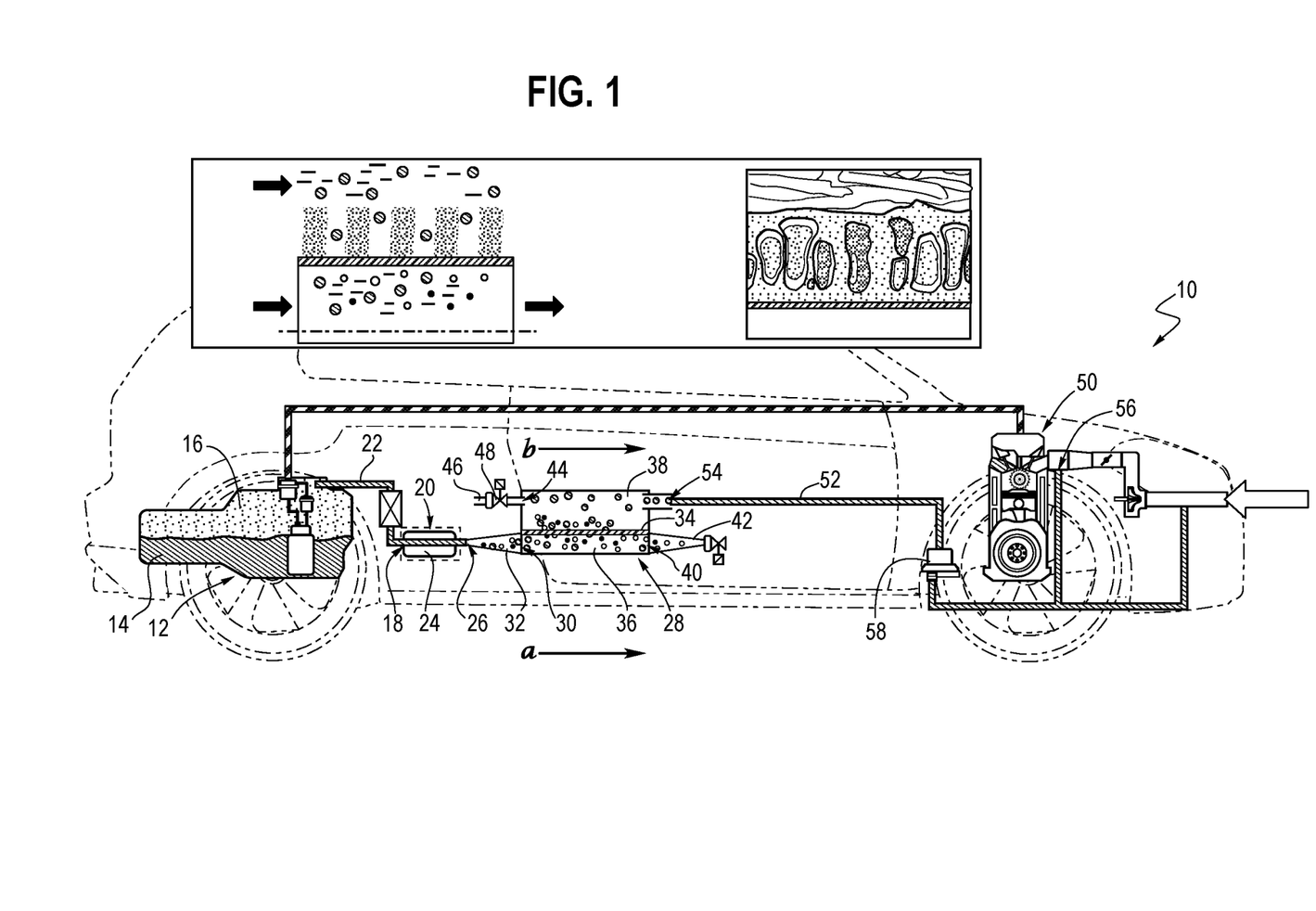
FIG. 1 shows a schematic diagram of a first membrane module-equipped evaporative emission mitigation system.

An evaporative emission mitigation system 10 is shown in FIG. 1. The evaporative emission mitigation system 10 includes a fuel tank 12, which contains a volume of liquid fuel 14. The liquid fuel 14, upon exposure to high ambient temperatures or indirect heating via sunlight on the motor vehicle, for example, evaporates, creating gaseous hydrocarbon fuel vapor 16 with high concentrations of hydrocarbons.

The fuel tank 12 is connected to a fuel tank connection 18 on a canister 20 via a tank passage 22. The canister 20 is a conventional evaporative emission mitigation canister filled with an adsorbent material 24 that adsorbs and sequesters gaseous hydrocarbons within the fuel vapor emanating from the fuel tank 12. The housing of the canister 20 may be made out of any appropriate material, such as plastic, fiberglass, metal, or the like. In a preferred embodiment, the housing of the canister 20 is made out of a blow-molded thermoplastic.

The canister 20 is shaped appropriately to fit within a defined space on the motor vehicle and to meet the specific evaporative emission mitigation requirements of the motor vehicle. Non-limiting examples of canister shapes include cylindrical, cuboidal, and cubic.

Any known gaseous hydrocarbon adsorbing material can be used within the canister 20. Non-limiting examples of adsorbent materials 24 include activated carbon, carbon charcoal, zeolites, clays, porous polymers, porous alumina, porous silica, molecular sieves, kaolin, titania, ceria, or combinations thereof. In the most common applications, the adsorbent material 24 is activated carbon.

Any acceptable adsorbent material 24 forms may be used within the canister 20. Non-limiting examples of adsorbent material 24 forms that may be used include granular, pellet, spherical, pelletized cylindrical, particulate media of uniform shape, and particulate media of non-uniform shape.

The adsorbent material 24 is preferably pelletized activated carbon in the disclosed embodiments.

The canister 20 preferably contains a number of internal dividing walls, such that the interior of the canister 20 is divided into a number of open-ended compartments, which create a meandering path for the fuel vapor traveling through the adsorbent material 24.

The canister 20 is appropriately sized to provide sufficient fuel vapor capture based on the motor vehicle on which it is installed. For example, the canister 20 has an internal volume of about 1 to about 3 liters in the embodiments described herein. The canister 20 optionally has an internal volume of about 2 liters, or optionally has an internal volume of about 1.8 L.

The generation of fuel vapor 16 via evaporation of liquid fuel 14 within the fuel tank 12 causes pressure to build within the fuel tank 12. The pressure buildup forces the fuel vapor 16 into the tank passage 22. The fuel vapor 16 subsequently enters the canister 20 at the fuel tank connection 18 and travels through the canister 20, preferably via a meandering flow path. As the fuel vapor migrates through the canister 20, a significant portion of the gaseous hydrocarbons within the fuel vapor adsorb to the adsorbent material 24 within the canister 20. Residual fuel vapor, which is fuel vapor that is not adsorbed within the canister 20 or fuel vapor that spontaneously desorbs from the adsorbent material 24, exits the canister 20 at a membrane-module connection 26 on the canister 20. The residual fuel vapor has low concentrations of hydrocarbons in comparison to the fuel vapor entering the canister 20 from the fuel tank 12.

The membrane-module connection 26 links the canister 20 to a membrane module 28 at a canister connection 30 on the membrane module 28, via a canister passage 32. The housing of the membrane module 28 may be made out of any appropriate material, such as plastic, polymer, fiberglass, metal, or the like. In a preferred embodiment, the housing of the membrane module 28 is made out of a blow-molded thermoplastic.

The membrane module 28 is shaped appropriately to fit within a defined space on the motor vehicle and to meet the specific evaporative emission mitigation needs of the motor vehicle. For example, the membrane module 28 may have a cylindrical shape, a cuboidal shape, or a cubic shape.

A membrane 34 divides the membrane module 28, forming a first compartment 36 and a second compartment 38. The canister connection 30 feeds the flow of residual fuel vapor exiting the canister 20 into the first compartment 36 via the canister passage 32. The first compartment 36 and second compartment 38 are generally sealed from one another by the membrane 34. Gaseous hydrocarbons in the residual fuel vapor permeate the membrane 34, migrating from the first compartment 36 and concentrating in the second compartment 38, while inert air components, e.g. oxygen and nitrogen, are preferentially retained in the first compartment 36, as described above.

The diffusion of the fuel vapor across the membrane 34 occurs along the length of the membrane, such that the first compartment 36 has a fuel vapor concentration gradient, wherein the fuel vapor concentration within the first compartment 36 is lower near a first atmosphere connection 40 than it is near the canister connection 30. The second compartment 38, therefore, has an inverse fuel vapor concentration gradient compared to the first compartment 36, wherein the fuel vapor concentration in the second compartment 38 is higher near a second atmosphere connection 44 than it is near an engine connection 54.

The membrane 34 is made from a material capable of selectively separating gaseous hydrocarbon fuel vapor from inert components of air, e.g. oxygen and nitrogen, via the mechanism described above. The membrane 34 preferably includes silicone as an active layer for separating gaseous hydrocarbon fuel vapor from inert components of air, such as oxygen and nitrogen.

The membrane 34 is organized in any appropriate shape for separating the hydrocarbons within the residual fuel vapor from inert air components. For example, the membrane 34 may be organized as a flat sheet, in a corrugated structure, in a fluted structure, or in a coiled structure.

The membrane 34 is sized appropriately to satisfy the specific evaporative emission mitigation needs of the motor vehicle. For example, the membrane 34 has a surface area of between 0.1 $m^2$ and 2 $m^2$ in the embodiments described herein. The membrane 34 may optionally have a surface area of between 0.1 $m^2$ and 1 $m^2$.

The membrane 34 is secured within the membrane module in any manner that generally seals the first compartment from the second compartment and provides for the separation of gaseous hydrocarbons into the second compartment from the first compartment. For example, the membrane 34 is secured within the membrane module 28 by anchoring the membrane 34 to a support element, wherein the support element is anchored to the housing of the membrane module 28 in the embodiments described herein. The membrane 34 may alternatively be secured within the membrane module 28 by anchoring the membrane 34 directly to the housing of the membrane module.

The membrane 34 is configured such that multiple membranes can be stacked, layered, or otherwise combined with one another, thereby enhancing the separation capacity of the membrane module 28 and allowing the evaporative emission mitigation system 10 to be tuned to the specific mitigation needs of a particular motor vehicle design.

In the embodiments disclosed herein, the first compartment 36 and the second compartment 38 are about equal in volume to one another. The first compartment 36 may optionally be larger in volume than the second compartment 38, or may optionally be smaller in volume than the second compartment 38.

The first compartment 36 has a first atmosphere connection 40, which connects the first compartment 36 to the open atmosphere via a vent passage 42. The inert air components preferentially retained in the first compartment 36 exit the first compartment 36 via the first atmosphere connection 40 and return to the open atmosphere via the vent passage 42, flowing in the relative direction indicated by arrow a.

The second compartment 38 has a second atmosphere connection 44, which connects the second compartment 38 to the open atmosphere via a sweep passage 46. The second atmosphere connection 44 is arranged on the membrane module adjacent the canister connection 30, upstream of the first atmosphere connection 40. Air from the open atmosphere flows into the second compartment 38, in the direction of the other arrow b, through the second atmosphere connection 44 via the sweep passage 46.

A one-way sweep valve 48 is disposed along the sweep passage 46. The sweep valve 48 may alternatively be disposed at the second atmosphere connection 44. The sweep valve 48 is configured to allow fluid flow from the open atmosphere into the second compartment 38 via the sweep passage 46, while preventing flow of the concentrated fuel vapor within the second compartment 38 toward the open atmosphere. The sweep valve 48 is a standard check valve in the embodiments disclosed herein. The sweep valve 48 may alternatively be configured to remain in a closed state while the motor vehicle engine 50 is an off state, and to allow fluid flow from the open atmosphere into the second compartment 38 via the sweep passage 46 upon engine ignition. The sweep valve 48 may be actuated to the open position in response to the ignition of the engine by any appropriate method known in the art including, but not limited to, using a solenoid-controlled valve or a pneumatically controlled valve. The sweep valve 48 may optionally be omitted from the evaporative emission mitigation system 10.

The flow of air into the second compartment 38 sweeps the gaseous hydrocarbons out of the second compartment 38 and towards the vehicle engine 50, where they are ultimately combusted. The second compartment 38 is connected to the engine 50 via a purge passage 52, which links an engine connection 54 on the second compartment 38 to a purge connection 56 on the engine 50.

A purge valve 58 is disposed along the purge passage 52 or may alternatively be disposed at the engine connection 54. The purge valve 58 is configured to open upon ignition of the engine 50, allowing fluid flow from the second compartment 38 into the engine 50. The purge valve 58 remains closed while the engine 50 is in an off state, thereby ensuring that gaseous hydrocarbons cannot be vented to the open atmosphere prior to ignition of the engine 50. The purge valve 58 is a spring-equipped check valve in the embodiments disclosed herein, wherein the spring-equipped check valve opens in response to the motor vehicle engine 50 reaching a particular power threshold. The purge valve 58 may alternatively be any appropriate valve known in the art including, but not limited to, a solenoid-controlled or pneumatically controlled valve. The purge valve 58 may optionally be omitted from the evaporative emission mitigation system 10.

Figure 2:
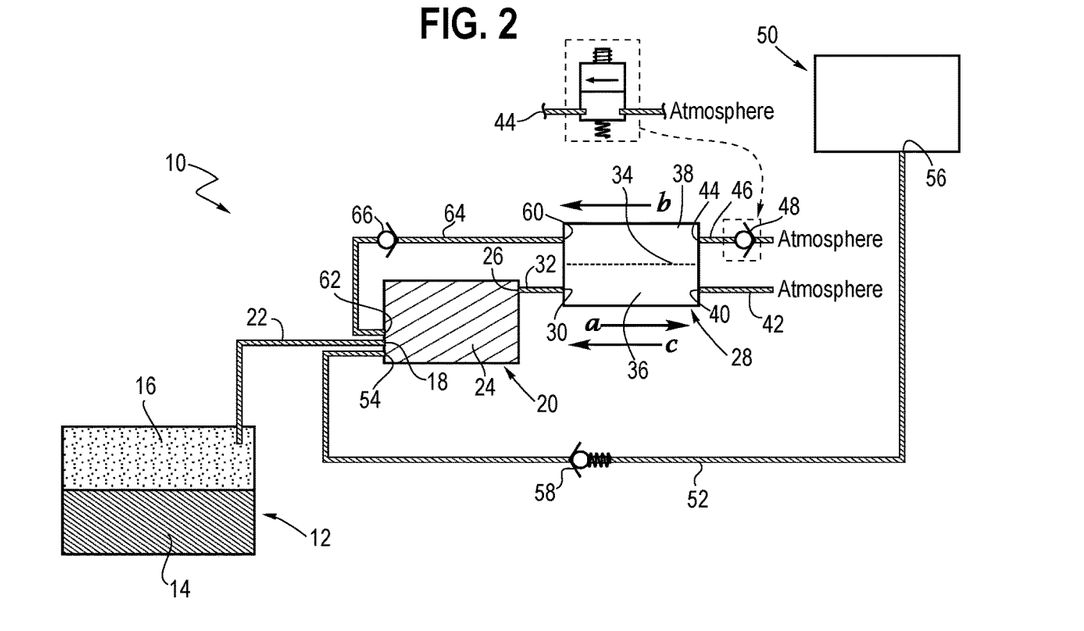
FIG. 2 shows a schematic diagram of a second membrane module-equipped evaporative emission mitigation system.

A variation of an evaporative emission mitigation system 10 is shown in FIG. 2. The system of FIG. 2 contains many of the same components and features, as described above for the system illustrated by FIG. 1. For example, the evaporative emission mitigation system 10 illustrated in FIG. 2 has a fuel tank 12, with a volume of liquid fuel 14, which evaporates into gaseous hydrocarbon fuel vapor 16. The fuel tank 12 is connected to a fuel tank connection 18 on a canister 20, which is filled with adsorbent material 24, via a tank passage 22. The canister 20 has a membrane-module connection 26, which connects the canister 20 to a membrane module 28 at a canister connection 30 via a canister passage 32. A membrane 34 divides the membrane module 28 into a first compartment 36 and a second compartment 38. The first compartment 36 has a first atmosphere connection 40, which connects the first compartment 36 to the open atmosphere via a vent passage 42, allowing the release of inert air components, such as oxygen and nitrogen, from the first compartment into the open atmosphere. The second compartment 38 has a second atmosphere connection 44, which links the second compartment to the open atmosphere via the sweep passage 46. A sweep valve 48 is disposed along the sweep passage 46, but may alternatively be disposed at the second atmosphere connection 44, or omitted from the evaporative emission mitigation system 10.

The evaporative emission mitigation system 10 of FIG. 2 differs from the system illustrated in FIG. 1 in that the second atmosphere connection 44 is arranged on the membrane module 28 adjacent the first atmosphere connection 40, downstream of the canister connection 30.

The second compartment additionally has a canister return connection 60 upstream of the second atmosphere connection 28 and adjacent the canister connection 30. The canister return connection 60 connects the second compartment 38 to the canister 20 at a second compartment connection 62 via a recycling passage 64. The second compartment connection 62 is arranged on the canister 20 adjacent the fuel tank connection 18, upstream of the membrane module connection 26. A recycling valve 66 is disposed along the recycling passage 64. The recycling valve 66 may optionally be omitted from the evaporative emission mitigation system 10.

The flow of air from atmosphere into the second compartment 38 through the second atmosphere connection 44 via the sweep passage 46 sweeps the concentrated fuel vapor in the second compartment 38 through the return canister connection 60 and into the canister, via the recycling passage 64. The continuous evacuation of the gaseous hydrocarbon fuel vapor from the second compartment 38 maintains a hydrocarbon partial pressure gradient over time between the first compartment 36 and the second compartment 38, such that additional residual fuel vapor entering the first compartment 36 is efficiently separated into the gaseous hydrocarbons and the inert air components by the membrane 34, as described above. The return of the gaseous hydrocarbons to the canister 20 at the second compartment connection 62 again passes the hydrocarbons through the canister 20, where they are adsorbed by the adsorbent material 24, thereby reducing the emission of hydrocarbons that are not efficiently sequestered on a first pass through the canister 20 or that may have spontaneously desorbed from the adsorbent material 24.

The recycling valve 66 is a one-way valve configured to allow the flow of fuel vapor from the second compartment 38 back to the canister via the recycling passage 64, while preventing the reverse flow of fuel vapor from the canister 20 and into the second compartment 38. The recycling valve 66 is a standard check valve in the embodiments disclosed herein, but may alternatively be any appropriate valve known in the art.

The hydrocarbons adsorbed to the adsorbent material 24 within the canister 20 are desorbed and removed from the evaporative emission mitigation system 10 during a purge cycle. The vehicle engine 50 requires a constant supply of air for the combustion reaction that ultimately provides the mechanical power to propel the vehicle. A portion of the required air is supplied via a purge passage 52, which links an engine connection 54 on the canister 20 to a purge connection 56 on the engine 50. Ignition of the engine 50 results in a vacuum that pulls air from the open atmosphere into the engine 50 through the evaporative emission mitigation system 10 in the direction of arrow c via the flow path defined by the vent passage 42, first atmosphere connection 40, first compartment 36, canister connection 30, canister passage 32, membrane module connection 26, engine connection 54, purge passage 52, and purge connection 56. The pull of air through the evaporative emission mitigation system 10 desorbs hydrocarbons from the adsorbent material 24 within the canister 20, preparing the system to adsorb and sequester evaporative emissions when the engine 50 is disengaged and the vehicle is again exposed to conditions that create evaporative emissions.

A purge valve 58 is disposed along the purge passage 52, or may alternatively be disposed at the engine connection 54. As described above for the embodiment illustrated by FIG. 1, the purge valve 58 opens upon ignition of the engine 50, allowing fluid flow from the canister 20 into the engine 50. The purge valve 58 remains closed while the engine 50 is in an off state, thereby ensuring that fuel vapor cannot bypass a majority of the adsorbent material 24 within the canister 20 by flowing to the engine 50 via the purge passage 52.

Figure 3:
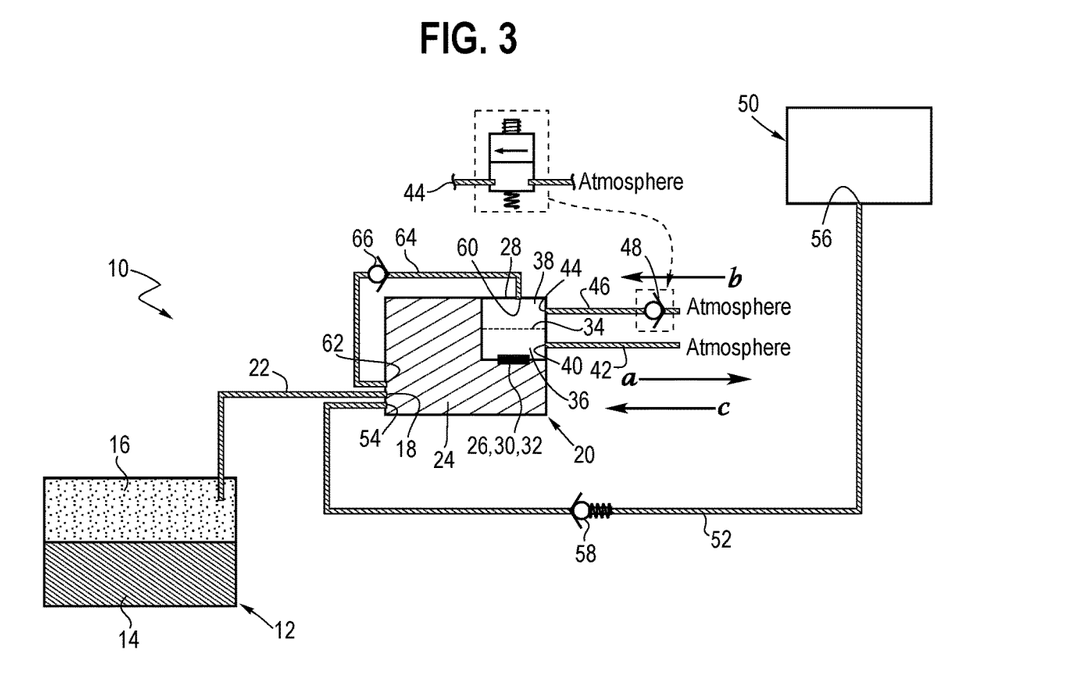
FIG. 3 shows a schematic diagram of a third membrane module-equipped evaporative emission mitigation system.

Another variation of an evaporative emission mitigation system 10 is shown in FIG. 3. The system of FIG. 3 contains the same components and features, as described above for the system illustrated by FIG. 2. The evaporative emission mitigation system 10 of FIG. 3, differs from the system shown in FIG. 2 in that the canister 20 and membrane module 28 share a common housing. The potential reduction of space required for mounting components of the evaporative emission mitigation system 10 on the motor vehicle is a potential advantage offered by the integration of the canister 20 and membrane module 28 into a single housing.

Figure 4:
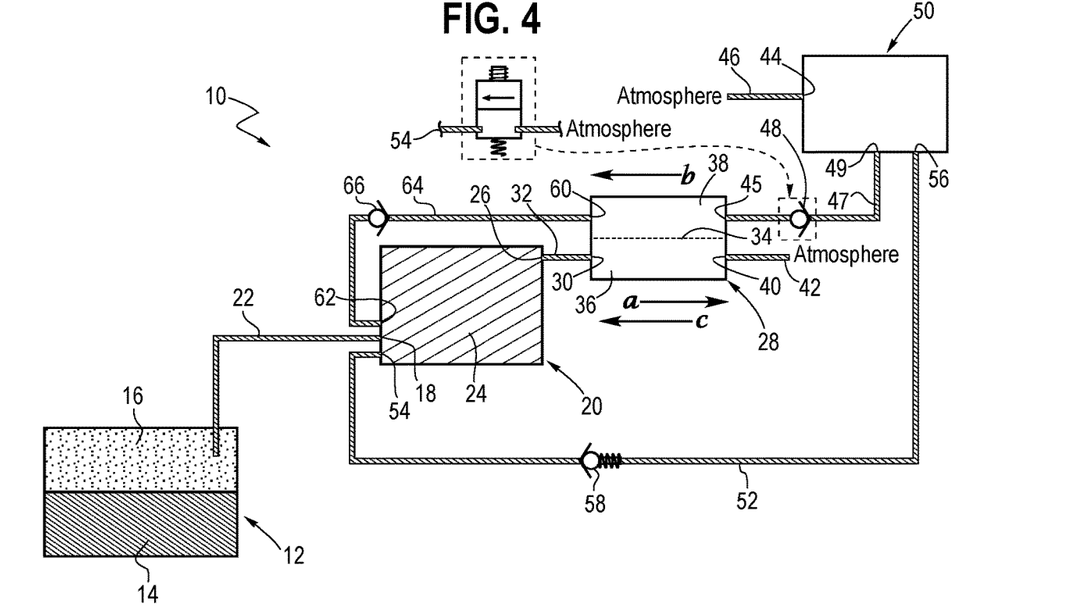
FIG. 4 shows a schematic diagram of a fourth membrane module-equipped evaporative emission mitigation system.

Yet another variation of an evaporative emission mitigation system 10 is shown in FIG. 4. The system of FIG. 4 contains many of the same components and features, as described above for the system illustrated by FIGS. 1-3. For example, the evaporative emission mitigation system 10 illustrated in FIG. 4 has a fuel tank 12, with a volume of liquid fuel 14, which evaporates into gaseous hydrocarbon fuel vapor 16. The fuel tank 12 is connected to a fuel tank connection 18 on a canister 20, which is filled with adsorbent material 24, via a tank passage 22. The canister 20 has a membrane-module connection 26, which connects the canister 20 to a membrane module 28 at a canister connection 30 via a canister passage 32. A membrane 34 divides the membrane module 28 into a first compartment 36 and a second compartment 38. The first compartment 36 has a first atmosphere connection 40 which connects the first compartment 36 to the open atmosphere via a vent passage 42, allowing the release of inert air components, such as oxygen and nitrogen, from the first compartment into the open atmosphere. The second compartment 38 has a canister return connection 60, which links the second compartment 38 to the canister 20 at a second compartment connection 62, via a recycling passage 64. A recycling valve 66 is disposed along the recycling passage 64 and is configured as described above for the evaporative emission mitigation system 10 illustrated by FIG. 2. The recycling valve 66 may optionally be omitted from the evaporative emission mitigation system 10.

The evaporative emission mitigation system 10 of FIG. 4 differs from the system illustrated in FIGS. 1-3 in that the second compartment 38 has a sweep connection 45, which connects the second compartment to the engine 50 at an engine sweep outlet 49 via an engine sweep passage 49. A second atmosphere connection 44 on the motor vehicle engine 50 connects the engine to the open atmosphere via a sweep passage 46. While the engine is in an off state, air from the open atmosphere flows into the engine 50 through the second atmosphere connection 44 via the sweep passage 46. The air subsequently flows from the engine 50 into the second compartment 38, in the direction of arrow b, through the engine sweep outlet 49, engine sweep passage 47, and sweep connection 45. The flow of air into the second compartment 38 provides the necessary sweep to return gaseous hydrocarbons in the second compartment 38 to the canister 20 at the second compartment connection 62 via the canister return connection 60 and recycling passage 64.

A sweep valve 48, as described above for the evaporative emission mitigation system illustrated by FIG. 2, is disposed along the engine sweep passage 49, or may alternatively be disposed at the sweep connection 45. The sweep valve 48 is configured to allow fluid flow only from the motor vehicle engine 50 into the second compartment 38, and to close and prevent the flow of fluid from the second compartment 38 into the motor vehicle engine 50 upon ignition of the engine 50. The sweep valve 48 may optionally be omitted from the evaporative emission mitigation system 10.

The hydrocarbons adsorbed to the adsorbent material 24 within the canister 20 are desorbed and removed from the evaporative emission mitigation system 10, as shown in FIG. 4, during a purge cycle. The vehicle engine 50 requires a constant supply of air for the combustion reaction that ultimately provides the mechanical power to propel the vehicle. Upon ignition of the engine 50, a vacuum formed within the engine pulls air in the direction of arrow c through the evaporative emission mitigation system 10 via a flow path defined by the vent passage 42, first atmosphere connection 40, first compartment 36, canister connection 30, canister passage 32, membrane module connection 26, canister 20, engine connection 54, purge passage 52, and purge connection 56. The sweep valve 48 is closed during the purge cycle following ignition of the engine 50, as described above, thereby ensuring that the air pulled through the vent passage 42 into the first compartment 36 must flow through the canister 20 before being pulled into the engine 50 via the purge passage 52. The pull of air through the evaporative emission mitigation system 10 desorbs hydrocarbons from the adsorbent material 24 within the canister 20, preparing the system to adsorb and sequester evaporative emissions when the engine 50 is disengaged and the vehicle is again exposed to conditions that create evaporative emissions. The sweep passage 46 is configured such that the maximum flow of air through the sweep passage 46 into the engine 50 does not significantly alter the vacuum applied by the engine 50 to the evaporative emissions system 10, thereby ensuring sufficient airflow through the canister 20 to effectively desorb the adsorbed hydrocarbons. A purge valve 58 is disposed along the purge passage 52, as described above for the evaporative emission mitigation system described by FIG. 1, but may optionally be omitted from the evaporative emission mitigation system 10.

While the embodiment illustrated by FIG. 4 shows the membrane module 28 outside and structurally distinct from the canister 20, the membrane module 28 may be integrated with the canister 20 within a common housing in alternative embodiments.

Figures 5, 5A:
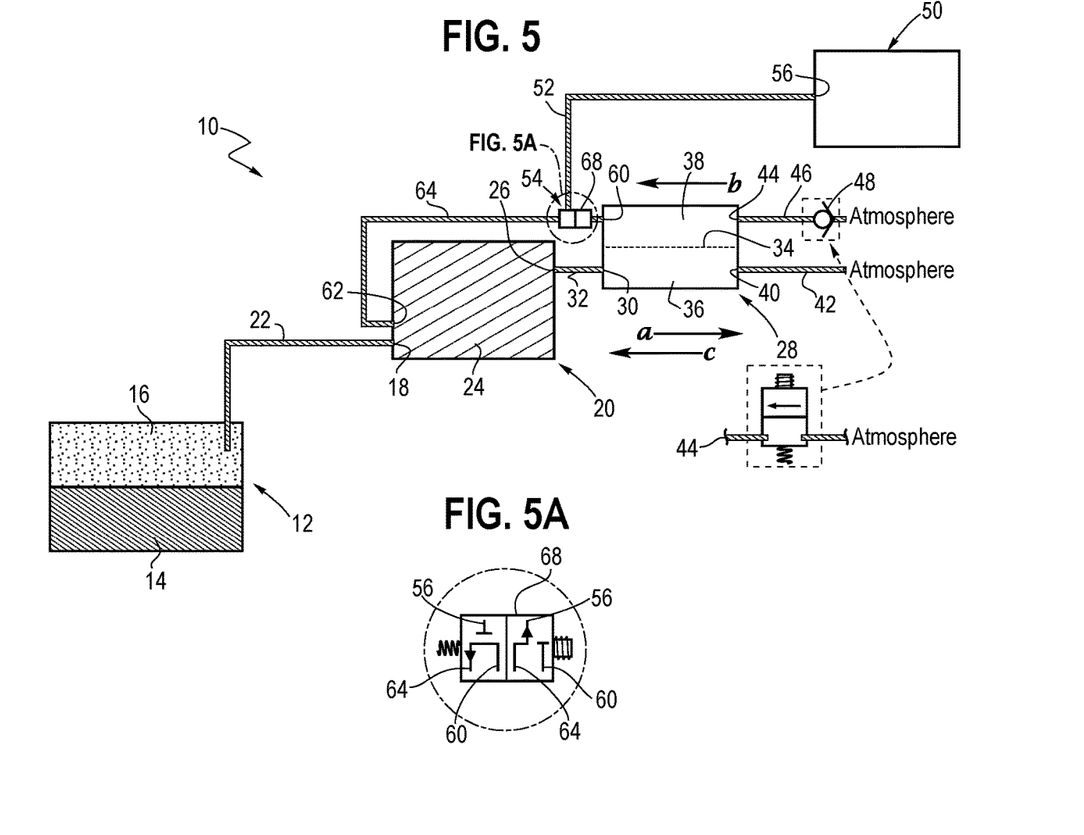
FIG. 5 shows a schematic diagram of a fifth membrane module-equipped evaporative emission mitigation system.
FIG. 5A shows an expanded view of the selector valve illustrated in FIG. 5.

Another variation of an evaporative emission mitigation system 10, as shown in FIG. 5, contains many of the same components and features, as described above for the system illustrated in FIGS. 1-4. For example, the evaporative emission mitigation system 10 illustrated in FIG. 5 has a fuel tank 12, with a volume of liquid fuel 14, which evaporates into gaseous hydrocarbon fuel vapor 16. The fuel tank 12 is connected to a fuel tank connection 18 on a canister 20, which is filled with adsorbent material 24, via a tank passage 22. The canister 20 has a membrane-module connection 26, which connects the canister 20 to a membrane module 28 at a canister connection 30 via a canister passage 32. A membrane 34 divides the membrane module 28 into a first compartment 36 and a second compartment 38. The first compartment 36 has a first atmosphere connection 40, which connects the first compartment 36 to the open atmosphere via a vent passage 42, allowing the release of inert air components, such as oxygen and nitrogen, from the first compartment into the open atmosphere. The second compartment 38 has a second atmosphere connection 44, which links the second compartment to the open atmosphere via the sweep passage 46. A sweep valve 48 is disposed along the sweep passage 46 as described above for the system illustrated by FIG. 2, or may alternatively be disposed at the second atmosphere connection 44. The sweep valve 48 may optionally be omitted from the evaporative emission mitigation system 10. The second compartment also has a canister return connection 60, which links the second compartment 38 to the canister 20 at a second compartment connection 62, via a recycling passage 64.

The evaporative emission mitigation system 10 of FIG. 5, differs from the system illustrated in FIGS. 1-4 in that the engine connection 54 is disposed along the recycling passage 64, such that the recycling passage is linked to the engine 50 at a purge connection 56, via a purge passage 52. A selector valve 68 is disposed along the purge passage 52 at the point that the purge passage 52 intersects with the recycling passage 64.

As shown in FIG. 5A, the selector valve 68 is configured to function as a one-way valve between the second compartment 38 and the canister 20 while the motor vehicle engine 50 is in an off state. The selector valve, while in this configuration, allows fuel vapor to flow from the second compartment 38 into the canister 20, and prevents the flow of the fuel vapor from the second compartment 38 into the purge passage 52 or from the canister 20 into the second compartment 38. Upon ignition of the engine 50, the selector valve 68 is reconfigured to allow fluid flow from the recycling passage 64 into the engine 50 via the purge passage 52. The selector valve 68 is a standard 3/2 valve in the embodiments disclosed herein. The operating position of the 3/2 selector valve 68 may be modulated between the described configurations by any acceptable method known in the art including, but not limited to, using a solenoid-controlled or pneumatically controlled valve. The 3/2 selector valve 68 may optionally be replaced by any appropriate valve known in the art configured to control the flow path through the evaporative emission mitigation system 10, as described above.

The hydrocarbons adsorbed to the adsorbent material 24 within the canister 20 are desorbed and removed from the evaporative emission mitigation system 10, as shown in FIG. 5, during a purge cycle. The vehicle engine 50 requires a constant supply of air for the combustion reaction that ultimately provides the mechanical power to propel the vehicle. Upon ignition of the engine 50, a vacuum within the engine pulls air in the direction of an arrow c through the evaporative emission mitigation system 10 via a flow path defined by the vent passage 42, first atmosphere connection 40, first compartment 36, canister connection 30, canister passage 32, membrane module connection 26, canister 20, second compartment connection 62, recycling passage 64, selector valve 68, engine connection 54, purge passage 52, and purge connection 56. The pull of air through the evaporative emission mitigation system 10 desorbs hydrocarbons from the adsorbent material 24 within the canister 20, preparing the system to adsorb and sequester evaporative emissions when the engine 50 is disengaged and the vehicle is again exposed to conditions that create evaporative emissions. As described above, upon ignition of the motor vehicle engine 50, the selector valve 68 is configured to allow the flow of fluid from the canister 20 to the motor vehicle engine 50.

While the embodiment illustrated by FIG. 5 shows the membrane module 28 outside and structurally distinct from the canister 20, the membrane module 28 may be integrated with the canister 20 within a common housing in alternative embodiments.

While the above description constitutes the preferred embodiments of the present invention, it will be appreciated that the invention is susceptible to modification, variation and change without departing from the proper scope and fair meaning of the accompanying claims.

What is claimed is:

1. An evaporative emission mitigation system for a motor vehicle comprising:
   a tank passage configured to connect to a fuel tank at a first end of the tank passage;
   a canister connected to the tank passage at a second end of the tank passage, wherein the canister comprises an adsorbent material;
   a canister passage connected to the canister downstream of the tank passage at a first end of the canister passage;
   a membrane module connected to the canister passage downstream of the canister at a second end of the canister passage, wherein the membrane module comprises a membrane, wherein the membrane divides the membrane module into a first compartment and a second compartment;
   a recycling passage connected to the membrane module downstream of the canister passage at a first end of the recycling passage and to the canister upstream of the canister passage at a second end of the recycling passage;
   a purge passage configured to connect to an engine at a first end of the purge passage and connect to the canister at a second end of the purge passage;
   a sweep passage configured to connect the engine to an open atmosphere; and
   an engine sweep passage configured to connect the second compartment to the engine,
   wherein:
   the tank passage is configured to pass a volume of fuel vapor from the fuel tank to the canister;
   the adsorbent material is configured to adsorb a portion of the volume of fuel vapor, thereby generating a residual volume of fuel vapor;
   the canister passage is configured to pass the residual volume of fuel vapor to the membrane module;
   the membrane is configured to separate the residual volume of fuel vapor into a volume of gaseous hydrocarbons and a volume of inert air components; and
   the recycling passage is configured to pass the volume of gaseous hydrocarbons to the canister.

2. The evaporative emission mitigation system of claim 1, wherein the membrane module is configured to separate the volume of gaseous hydrocarbons into the second compartment.

3. The evaporative emission mitigation system of claim 1, wherein the membrane module is configured to retain the volume of inert air components in the first compartment.

4. The evaporative emission mitigation system of claim 3, wherein the evaporative emission mitigation system further comprises a vent passage configured to connect the first compartment to an open atmosphere.

5. The evaporative emission mitigation system of claim 4, wherein the evaporative emission mitigation system is configured to evacuate the volume of inert air components from the first compartment to the open atmosphere via the vent passage.

6. The evaporative emission mitigation system of claim 1, wherein the evaporative emission mitigation system further comprises a sweep passage configured to connect the second compartment to an open atmosphere.

7. The evaporative emission mitigation system of claim 6, wherein the second compartment is configured to receive a flow of sweep air from the open atmosphere via the sweep passage and to cause the flow of sweep air to push the volume of gaseous hydrocarbons to the canister via the recycling passage.

8. The evaporative emission mitigation system of claim 7, wherein the evaporative emission mitigation system further comprises a sweep valve, which is a one-way valve, wherein the sweep valve is disposed along the sweep passage and the one-way valve is configured to allow the flow of sweep air into the second compartment via the sweep passage while preventing a flow of gaseous hydrocarbons out of the second compartment and into the open atmosphere via the sweep passage.

9. The evaporative emission mitigation system of claim 6, wherein the purge passage is connected to the canister at a second end of the purge passage.

10. The evaporative emission mitigation system of claim 9, wherein the evaporative emission mitigation system is configured to undergo a purge cycle wherein a volume of air is pulled from the open atmosphere through the evaporative emission mitigation system via a flow path extending through the vent passage, the first compartment, the canister passage, the canister, and the purge passage.

11. The evaporative emission mitigation system of claim 10, wherein the evaporative emission mitigation system further comprises a purge valve, wherein the purge valve is disposed along the purge passage and the purge valve is configured to be closed while the engine is in an off state and to be opened upon an ignition of the engine.

12. The evaporative emission mitigation system of claim 6, wherein the purge passage is connected to the recycling passage at a second end of the purge passage.

13. The evaporative emission mitigation system of claim 12, wherein the evaporative emission mitigation system is configured to undergo a purge cycle wherein a volume of air is pulled from the open atmosphere through the evaporative emission mitigation system and into the engine via a flow path extending through the vent passage, the first compartment, the canister passage, the canister, the recycling passage, and the purge passage.

14. The evaporative emission mitigation system of claim 13, wherein the evaporative emission mitigation system further comprises a selector valve, wherein the selector valve is disposed along the purge passage at a point that the purge passage intersects the recycling passage and the selector valve is configured to prevent a flow of gaseous hydrocarbons through the purge passage while the engine is in an off state and to allow the flow of gaseous hydrocarbons through the purge passage upon an ignition of the engine.

15. The evaporative emission mitigation system of claim 1, wherein the second compartment is configured to receive a flow of sweep air from the open atmosphere via a flow path extending through the sweep passage and the engine sweep passage, and to cause the flow of sweep air to push the volume of gaseous hydrocarbons to the canister via the recycling passage.

16. The evaporative emission mitigation system of claim 1, wherein the evaporative emission mitigation system is configured to undergo a purge cycle wherein a volume of air is pulled from the open atmosphere through the evaporative emission mitigation system via a flow path extending through the vent passage, the first compartment, the canister passage, the canister, and the purge passage.

\* \* \* \* \*